United States Patent [19]

Miyoshi et al.

[11] Patent Number: 6,008,290

[45] Date of Patent: *Dec. 28, 1999

[54] MILDEW RESISTANT ORGANOPOLYSILOXANE WITH HYDROLYZABLE ORGANOSILANE AND TRIAZOLYL COMPOUND

[75] Inventors: Kei Miyoshi, Annaka; Tokuo Sato, Gunma-ken; Yoshio Inoue, Annaka, all of Japan

[73] Assignee: Shin-Etsu Chemical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/602,449

[22] Filed: Feb. 16, 1996

[30] Foreign Application Priority Data

Feb. 16, 1995 [JP] Japan ..................................... 7-027826
Jul. 10, 1995 [JP] Japan ..................................... 7-197097

[51] Int. Cl.$^6$ ............................... C08K 5/05; C08K 5/23; C08L 83/06

[52] U.S. Cl. .......................... 524/720; 524/106; 524/863; 523/122; 528/34

[58] Field of Search ............................. 523/122; 524/863, 524/106, 720; 528/34

[56] References Cited

U.S. PATENT DOCUMENTS

| | | | |
|---|---|---|---|
| 4,454,262 | 6/1984 | Fukuyama et al. | 528/34 |
| 4,554,187 | 11/1985 | Grape et al. | 524/588 |
| 4,760,123 | 7/1988 | Imai et al. | 528/18 |
| 4,845,111 | 7/1989 | Brandes et al. | 514/383 |
| 5,118,755 | 6/1992 | Endo et al. | 528/19 |
| 5,424,354 | 6/1995 | Takeoka | 524/588 |
| 5,534,588 | 7/1996 | Knepper et al. | 528/19 |
| 5,565,541 | 10/1996 | Carbary et al. | 528/18 |

FOREIGN PATENT DOCUMENTS

| | | |
|---|---|---|
| 180313 | 5/1986 | European Pat. Off. . |
| 7-76654 | 3/1995 | Japan . |

*Primary Examiner*—Robert E. Sellers
*Attorney, Agent, or Firm*—Pillsbury Madison & Sutro LLP

[57] ABSTRACT

A room temperature curable mildew resistant organopolysiloxane composition comprises (A) a hydroxyl or hydrolyzable group-containing organopolysiloxane, (B) a hydrolyzable organosilane such as methyltrimethoxysilane, methyltris(methylethylketoxime silane) or vinyltris(methylethylketoxime silane), a partially hydrolyzed product thereof or a mixture of the hydrolyzable organosilane with the partially hydrolyzed product thereof; and (C) a triazolyl group-containing compound such as 2-(4-chlorophenyl)ethyl-α-(1,1-dimethylethyl)-1H-1,2,4-triazole-1-yl-ethanol. Preferably, the component (B) does not contain aliphatic unsaturation in the molecule, and in this case, the component (B) free of aliphatic unsaturation is used in combination with (B') a hydrolyzable silane such as tetrakis(dimethylketoxime)silane, a partially hydrolyzed product thereof or a mixture of the hydrolyzable silane and the partially hydrolyzed product thereof.

10 Claims, No Drawings

MILDEW RESISTANT ORGANOPOLYSILOXANE WITH HYDROLYZABLE ORGANOSILANE AND TRIAZOLYL COMPOUND

BACKGROUND OF THE INVENTION

1. Field of the Invention

The present invention relates to an organopolysiloxane composition useful as a sealant or the like, the cured product of the composition being excellent in mildew resistance, weather resistance such as resistance to ultraviolet light, and the like.

2. Description of the Prior Art

Since room temperature curable organopolysiloxane compositions capable of curing by moisture contained in the air is easy in handling and the cured product thereof is excellent in weather resistance, they are used in sealants for construction, adhesives in electric and electronic industries, and the like. Particularly, deoxime type room temperature curable organopolysiloxane compositions have a good adhesion to various adherends and also an excellent weather resistance, so that they are used as sealants for places where, for example, in houses, water is often used or a large amount of moisture exists, such as kitchens, bathes and lavatories.

On the other hand, with an improvement in construction techniques of houses in recent years, the air tight properties of houses have been also improved. Thus, said places where in houses, water is often used or a large amount of moisture exists become a suitable habitat for microbes such as mildew. Particularly, mildew inserts its hypha even into the inside of the cured product (silicone rubber) of the composition, so that it is difficult to remove mildew by means of not only wiping but also application of chemicals and the appearance of the cured product is often impaired. In order to prevent the breeding and growth of mildew in the cured products of the compositions, among the room temperature curable organopolysiloxane compositions conventionally used as sealants for places where water is often used or a large amount of moisture exists, there are known compositions in which a mildewproofing agent such as benzimidazole compounds and Zinc Pyrithione has been blended. However, the cured products of the compositions containing a mildewproofing agent have the drawback that they are turned yellow by heating or exposure to ultraviolet light. This inclination is remarkable particularly in the deoxime type compositions using an unsaturated group-containing hydrolyzable organosilane as a curing agent. When the amount of a mildewproofing agent contained in the composition is decreased to an extent in which yellowing does not occur, the mildew resistance of the composition can not be sufficiently exhibited.

SUMMARY OF THE INVENTION

An object of the present invention is to provide a room temperature curable organopolysiloxane composition, the cured product of which is excellent in mildew resistance and little turns yellow by heating or exposure to ultraviolet light while having a good adhesion to various adherends.

According to the present invention, there is provided a room temperature curable mildew resistant organopolysiloxane composition comprising:

(A) a hydroxyl or hydrolyzable group-containing organopolysiloxane represented by the following general formula (1):

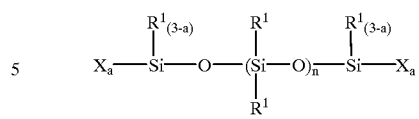

wherein X is a hydroxyl group or a hydrolyzable group, a plurality of $R^1$, which may be the same or different, are independently a monovalent hydrocarbon group, n is an integer of 8 or more, and a is an integer of 1 to 3;

(B) at least one compound selected from the group consisting of a hydrolyzable organosilane represented by the following general formula (2):

$$R^2_b SiX'_{(4-b)} \quad (2)$$

wherein $R^2$ is independently a monovalent hydrocarbon group, X' is a hydrolyzable group, and b is an integer of 0 to 2, and a partially hydrolyzed product thereof; and (C) a triazolyl group-containing compound represented by the following general formula (3):

$$Y-CR^3R^4-CR^5R^6-Z \quad (3)$$

wherein $R^3$ and $R^4$ are independently a hydrogen atom or an unsubstituted or substituted monovalent hydrocarbon group, $R^5$ and $R^6$ are independently a hydrogen atom, an alkyl group or an alkoxyl group, Y is a hydroxyl group or a nitrile group, and Z is a triazolyl group.

The room temperature curable organopolysiloxane composition of the present invention features in that the cured product thereof is excellent in mildew resistance and scarcely turns yellow even by heating or exposure to ultraviolet light. Further, in the case of a deoxime type room temperature curable organopolysiloxane according to the present invention, for example, even if a stress extending the cured film in the directions opposite to each other or a stress compressing the same is loaded on the composition in the initial stage of curing thereof, the surface of the composition under curing can be prevented from cracking.

DETAILED DESCRIPTION OF THE PREFERRED EMBODIMENTS

The present invention will now be described in more detail.

(A) Hydroxyl or Hydrolyzable Group-Containing Organopolysiloxane

The hydroxyl or hydrolyzable group-containing organopolysiloxane used as the component (A) in the present invention is represented by said general formula (1). In the general formula (1), typical examples of the unsubstituted or substituted monovalent hydrocarbon group of $R^1$ include an unsubstituted or substituted monovalent hydrocarbon group having 1 to 10 carbon atoms, for example, an alkyl group such as methyl, ethyl, propyl, isopropyl, butyl, isobutyl, tert-butyl, pentyl, neopentyl, hexyl, heptyl, octyl, nonyl and decyl groups; a cycloalkyl group such as cyclopentyl, cyclohexyl and cycloheptyl groups; an alkenyl group such as vinyl, allyl, propenyl, isopropenyl, butenyl, isobutenyl, hexenyl and cyclohexenyl groups; an aryl group such as phenyl, tolyl and xylyl groups; an aralkyl group such as benzyl, phenylethyl, phenylpropyl and methylbenzyl groups; and a radical derived from said groups by substituting at least part of hydrogen atoms bonded to carbon atoms contained in said groups with a substituent such as a halogen atom (for example, fluorine, chlorine and bromine atoms), a nitrile group or an amino group, for example, a halogen-substituted hydrocarbon group such as chloromethyl, 2-bromoethyl, 3-chloropropyl, 3,3,3-trifluoropropyl, 3,3,4,4,5,5,6,6,6-nonafluorohexyl, 4-chlorophenyl and 2-(4-chlorophenyl) ethyl and 4-fluorophenyl groups, a 3-aminopropyl group and a cyanoehtyl group; preferably an unsubstituted or substituted monovalent hydrocarbon group having 1 to 10 carbon atoms and being free of aliphatic unsaturation, such as an alkyl group, a cycloalkyl group, an aryl group, an aralkyl group, and a radical derived from said groups by the substitution of at least part of hydrogen atoms thereof with a substituent, as mentioned above; and more preferably methyl, phenyl and 3,3,3-trifluoropropyl groups. The $R^1$ groups may be the same or different.

In said general formula (1), n is generally an integer of 8 or more so that the organopolysiloxane (1) has a viscosity at 25° C. of 25 to 500,000 cSt, preferably 700 to 100,000 cSt, more preferably 1,000 to 100,000 cSt.

In said general formula (1), X represents a hydroxyl group or a hydrolyzable group. Examples of the hydrolyzable group include alkoxy, ketoxime, acyloxy, amino, amido, aminoxy and alkenyloxy groups. The symbol a is an integer of 1 to 3.

The hydroxyl or hydrolyzable group-containing organopolysiloxane represented by the above general formula (1) can be singly or in a combination of two or more thereof.

Examples of the hydroxyl or hydrolyzable group-containing organopolysiloxane (1) are as shown below.

I) Silanol group-containing organopolysiloxane represented by the following general formula (1-a):

$$HO(SiR^1{}_2O)_pH \qquad (1\text{-}a)$$

wherein a plurality of $R^1$ are an unsubstituted or substituted monovalent hydrocarbon group as defined in said general formula (1), and p is an integer of 10 or more so that the organopolysiloxane has a viscosity at 25° C. of 25 to 500,000 cSt, preferably 700 to 100,000 cSt.

Specific examples of $R^1$ in the general formula (1-a) are as enumerated in said general formula (1).

II) Hydroxyl group or hydrolyzable group-, preferably hydrolyzable group-, containing organopolysiloxane represented by the following general formula (1-b):

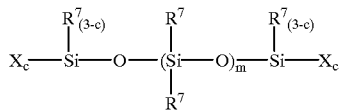
(1-b)

wherein a plurality of $R^7$ are an unsubstituted or substituted monovalent hydrocarbon group having 1 to 10 carbon atoms, a plurality of X are each a hydroxyl group or a hydrolyzable group, preferably a hydrolyzable group, c is generally an integer of 2 to 3 (when the component (A) is a mixture of a compound of the formula (1-b) where c is 2 and a compound of the formula (1-b) where c is 3, c ranges from 2 to 3 on average), and m is an integer of 10 or more so that the organopolysiloxane has a viscosity at 25° C. of 25 to 500,000 cSt, preferably 1,000 to 100,000 cSt.

In said general formula (1-b), specific examples of $R^7$ are the same as those exemplified for $R^1$ above.

(B) Hydrolyzable Organosilane, A Partially Hydrolyzed Product Thereof, or a Mixture of the Organosilane With the Partially Hydrolyzed Product Thereof The hydrolyzable organosilane used in the present invention is represented by said general formula (2) and acts as a crosslinking agent in the composition of this invention. In the general formula (2), $R^2$ is an unsubstituted or substituted monovalent hydrocarbon group, generally having 1 to 10 carbon atoms, and preferably an unsubstituted or substituted monovalent saturated aliphatic hydrocarbon group.

In the general formula (2), X' represents a hydrolyzable group such as alkoxy, ketoxime, acyloxy, amino, amido, aminoxy and alkenyloxy groups. The symbol b is an integer of 0 to 2. Specific examples of the unsubstituted or substituted monovalent hydrocarbon group having 1 to 10 carbon atoms of $R^2$ include the same examples as those of $R^1$ in said general formula (1). Specific examples of the monovalent saturated aliphatic hydrocarbon group of preferable $R^2$ is hereinafter described.

Typical examples of the hydrolyzable organosilane (2) are as follows.

I) Hydrolyzable organosilane represented by the general formula (2-a):

$$R^7{}_dSiX'{}_{(4-d)} \qquad (2\text{-}a)$$

wherein $R^7$ is an unsubstituted or substituted monovalent hydrocarbon group having 1 to 10 carbon atoms as defined in said general formula (1-b), X' is a hydrolyzable group, and d is an integar of 0 to 2, provided that a number of from 0 to 1.9 on average.

Specific examples of the unsubstituted or substituted monovalent hydrocarbon group having 1 to 10 carbon atoms of $R^7$ have been described above.

The hydrolyzable organosilane represented by the general formula (2-a) can be singly or in a combination of two or more thereof.

Specific examples of the hydrolyzable organosilane (2-a) include, for example, alkoxysilanes such as methyltrimethoxysilane, vinyltriethoxysilane, 3-chloropropyltrimethoxysilane and 3-aminopropyltriethoxysilane; ketoximesilanes such as methyltris(dimethylketoxime)silane, methyltris(methylethylketoxime)silane, ethyltris(methylethylketoxime)silane, methyltris(methylisobutylketoxime)silane, vinyltris(methylethylketoxime)silane, tetra(methylethylketoxime)silane, tetrakis(dimethylketoxime)silane, tetrakis(methylethylketoxime)silane and tetrakis(methylisobutylketoxime)silane; acyloxysilanes such as vinyltriacetoxysilane, methyltriacetoxysilane and phenyltriacetoxysilane; amidosilanes such as phenyltris(N-methylacetamido)silane and vinyltris(N-methylacetamido)silane; aminosilanes such as vinyltris(N-butylamino)silane and phenyltris(N,N-diethylamino)silane; aminoxysilanes such as methyltris(N,N-dimethylaminoxy)silane and vinyltris(N,N-diethylaminoxy)silane; and alkenyloxysilane such as vinyltriisopropenoxysilane, methyltriisobutenoxysilane and phenyltricyclohexanoxysilane; and preferably alkoxysilanes as above.

In the present invention, the partially hydrolyzed product of said hydrolyzable organosilane (2-a) and a mixture of the hydrolyzable organosilane (2-a) with the partially hydrolyzed product thereof can be also used as the component (B). Said partially hydrolyzed product can be singly or in a combination of two or more thereof.

II) Hydrolyzable Organosilane Represented by the General Formula (2-b):

$$R^8{}_eSi(ON=CR^9{}_2)_{(4-e)} \qquad (2\text{-}b)$$

wherein $R^8$ is an unsubstituted or substituted monovalent saturated aliphatic hydrocarbon group, $R^9$ is an unsubstituted or substituted monovalent hydrocarbon group, and e is an integer of 1 to 2. The group $R^8$ in the general formula (2-b) does not contain any unsaturated group which may cause discoloration.

In the general formula (2-b), typical examples of $R^8$ include an unsubstituted or substituted monovalent saturated aliphatic hydrocarbon group having 1 to 10 carbon atoms, for example, an alkyl group such as methyl, ethyl, propyl, isopropyl, butyl, isobutyl, tert-butyl, pentyl, neopentyl, hexyl, heptyl, octyl, nonyl and decyl groups; and a radical derived from said groups by substituting at least part of hydrogen atoms bonded to carbon atoms contained in said groups with a halogen atom such as fluorine, chlorine and bromine atoms, a cyano group, an amino group or the like, for example, a halogen-substituted hydrocarbon group such as chloromethyl, 2-bromoethyl, 3-chloropropyl, 3,3,3-trifluoropropyl, 3,3,4,4,5,5,6,6,6-nonafluorohexyl, 4-chlorophenyl and 2-(4-chlorophenyl)ethyl and 4-fluorophenyl groups, a 3-aminopropyl group and a cyanoehtyl group. Among them, particularly preferred is a methyl group.

In the general formula (2-b), examples of the unsubstituted or substituted monovalent hydrocarbon group represented by $R^9$ include the same groups as those exemplified as $R^1$ in said general formula (1), preferably an aliphatic saturated hydrocarbon group, and more preferably methyl, ethyl, propyl and butyl groups.

Specific examples of the hydrolyzable organosilane represented by the general formula (2-b) include ketoximesilanes such as methyltris(dimethylketoxime)silane, methyltris(methylethylketoxime)silane, ethyltris(methylethylketoxime)silane and methyltris(methylisobutylketoxime)silane. These hydrolyzable organosilanes can be singly or in a combination of two or more thereof. Of course, a partially hydrolyzed product of said hydrolyzable organosilane (2-b) and a mixture of the hydrolyzable organosilane (2-b) with the partially hydrolyzed product thereof can be also used as the component (B). In this case, the partially hydrolyzed product can be singly or in combination of two or more thereof.

Further, the hydrolyzable organosilane of the general formula (2-b), the partially hydrolyzed product thereof or a mixture of the hydrolyzable organosilane (2-b) with the partially hydrolyzed product thereof is preferably used in combination with a hydrolyzable silane, as component (B'), represented by the following general formula (2-b'):

$$Si(ON=CR^9{}_2)_4 \qquad (2\text{-}b')$$

wherein $R^9$ is as defined in said general formula (2-b). This hydrolyzable silane (2-b') corresponds to a hydrolyzable organosilane represented by said general formula (2-b) where e is 0.

Specific examples of the hydrolyzable silane represented by said general formula (2-b') include, for example, tetrakis(dimethylketoxime)silane, tetrakis(methylethylketoxime)silane and tetrakis(methylisobutylketoxime)silane.

Also, in place of the hydrolyzable silane of the general formula (2-b'), a partially hydrolyzed product thereof or a mixture of the hydrolyzable silane (2-b') with the partially hydrolyzed product thereof can be used in combination with the hydrolyzable organosilane (2-b) or the like. In this case, the partially hydrolyzed product can be singly or in a combination of two or more.

Further, in case of using the hydrolyzable organosilane of the general formula (2-b) together with the hydrolyzable silane of the general formula (2-b'), the organosilane (2-b). and the silane (2-b') are generally used in combination with the silanol group-containing organopolysiloxane represented by said general formula (1-a). Particularly, the combined use of the hydrolyzable organosilane (2-b), the component (B), with the hydrolyzable silane (2-b'), the component (B'), in the present invention results in effectively preventing the surface of the resulting deoxime type room temperature curable organopolysiloxane composition from cracking even if in the initial stage of curing of said composition, a stress extending a cured film in the directions opposite to each other or a stress compressing the cured film is loaded on the composition under curing.

The hydrolyzable organosilane represented by said general formula (2) [for example, the hydrolyzable organosiloxane of the general formula (2-a) or (2-b)], a partially hydrolyzed product thereof, or a mixture of the hydrolyzable organosilane (2) with the partially hydrolyzed product is used in an amount of generally 0.1 to 30 parts by weight, preferably 1 to 15 parts by weight, per 100 parts by weight of the component (A). If the amount is too small, crosslinking in curing the resulting composition is effected insufficiently so that the cured product may not be obtained as a rubber elastomer. On the other hand, if the amount is too large, the mechanical properties of the cured product may deteriorate.

In case of using at least one compound, as the component (B), selected from the group consisting of the hydrolyzable organosilane of the general formula (2-b) and a partially hydrolyzed product thereof in combination with at least one compound, as the component (B'), selected from the group consisting of the hydrolyzable silane of the general formula (2-b') and a partially hydrolyzed product thereof, the component (B') is used in an amount of generally 0.1 to 10 parts by weight, preferably 0.2 to 5 parts by weight, per 100 parts by weight of the component (A). If the amount is too small, cracks as mentioned above may occur, while if the amount is too large, micro-gels may be generated in the composition during the preparation thereof.

(C) Triazolyl Group-Containing Compound

The triazolyl group-containing compound used in the present invention is represented by said general formula (3) and is a component imparting mildew resistance, heat resistance and ultraviolet light resistance to the composition of the present invention. In this formula, $R^3$ and $R^4$ are each a hydrogen atom, or an unsubstituted or substituted monovalent hydrocarbon group. The monovalent hydrocarbon group include the same examples as those exemplified as $R^1$ in said general formula (1), preferably an aliphatic saturated hydrocarbon group. Particularly preferable $R^3$ and $R^4$ are a hydrogen atom, and 2-(4-chlorophenyl)ethyl, t-butyl, 4-chlorophenyl, dichlorophenyl and n-butyl groups.

In the general formula (3), $R^5$ and $R^6$ are each a hydrogen atom, an alkyl group or an alkoxy group. The alkyl group includes, for example, methyl, ethyl, propyl, isopropyl, butyl, isobutyl, tert-butyl, pentyl, neopentyl, hexyl, heptyl, octyl, nonyl and decyl groups. The alkoxy group includes, for example, methoxy, ethoxy and propoxy groups. Further, the alkoxy group defined herein includes a biphenylyl alkoxy group in which said alkoxy group has been bonded to the biphenylyl group. Particularly preferable $R^5$ and $R^6$ are a hydrogen atom and a biphenylyl alkoxy group.

The group Y in the general formula (3) is a hydroxyl group or a nitrile group.

The triazolyl group Z in the general formula (3) include, for example, 1,2,4-triazole-1-yl group represented by the following formula (3-a):

1,2,3-triazole-1-yl group represented by the following formula (3-b):

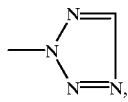

1,2,3-triazole-2-yl group represented by the following formula (3-c):

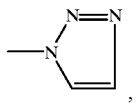

1,2,4-triazole-4-yl group represented by the following formula (3-d):

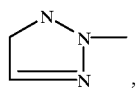

1,3,4-triazole-1-yl group represented by the following formula (3-e):

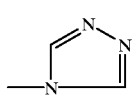

Particularly typical triazolyl group is 1,2,4-triazole-1-yl group represented by the formula (3-a).

Specific examples of the triazolyl group-containing compound used in the present invention include, for example, tebuconazole: 2-(4-chlorophenyl)ethyl-α-(1,1-dimethylethyl)-1H-1,2,4-triazole-1-yl-ethanol represented by the following formula:

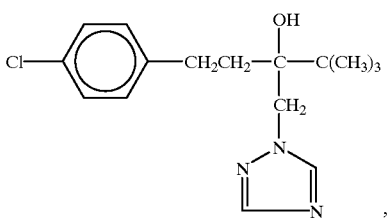

hexaconazole: (RS)-2-(2,4-dichlorophenyl)-1-(1H-1,2,4-triazole-1-yl)hexane-2-ol represented by the following formula:

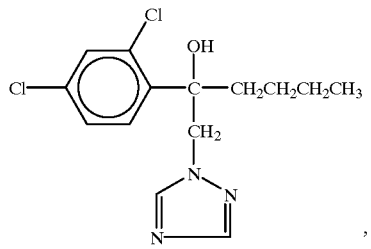

microbutanyl: 2-p-chlorophenyl-2-(1H-1,2,4-triazole-1-ylmethyl)hexane nitrile represented by the following formula:

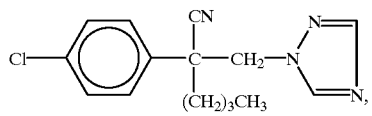

and bitertanol: all-rac-1-(biphenyl-4-yloxy)-3,3-dimethyl-1-(1H-1,2,4-triazole-1-yl)butane-2-ol represented by the following formula:

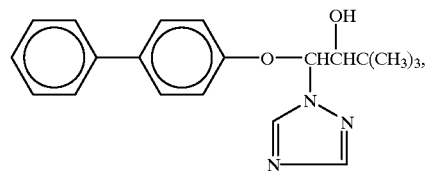

and preferably 2-(4-chlorophenyl)ethyl-α-(1,1-dimethylethyl)-1H-1,2,4-triazole-1-yl-ethanol (tebuconazole).

In case of using 1,2,4-triazole-1-yl compounds as the component (C), they are generally used in combination with the component (A) of the organopolysiloxane represented by the general formula (1-b) and the component (B) represented by the general formula (2-a).

The amount of the triazolyl group-containing compound used is generally 0.1 to 5 parts by weight, preferably 0.3 to 1 part by weight, per 100 parts by weight of the component (A). If the amount used is too small, the resulting composition may have a insufficient mildew resistance, heat resistance and ultraviolet light resistance. On the other hand, if the amount is too large, an improvement of said effect such as mildew resistance can not be expected to an extent corresponding to an increase of the amount used and further a cured product of the composition may turn yellow.

Other Components

To the composition of the present invention, curing catalysts, fillers, and various additives can be added in addition to said components (A) to (C).

Curing Catalyst

Curing catalysts include, for example, tin carbonates such as tin octenate, tin naphthenate, tin caprylate and tin oleate; tin compounds such as dibutyltin diacetate, dibutyltin dioctoate, dibutyltin dilaurate, dibutyltin dioleate, diphenyltin diacetate, dibutyltin oxide, dibutyltin dimethoxide, dibutylbis(triethoxysiloxy)tin and dibutyltin benzylmaleate; metal alkoxides such as tetraethyl titanate, tetrapropyl titanate, tetrabutyl titanate and tetraethoxy zirconate; organometal compounds such as iron octenate, iron naphthenate, lead naphthenate, zinc naphthenate, zinc stearate, zinc-2- ethylhexoate, lead-2-ethyloctoate, iron-2-ethylhexoate, cobalt-2-ethylhexoate, manganese-2-ethylhexoate, cobalt naphthenate and alkoxyaluminum compounds; aminoalkyl group-substituted alkoxysilanes such as 3-aminopropyltriethoxysilane and N-(trimethoxysilylpropyl)ethylenediamine; amine compounds and salts thereof, such as hexylamine and dodecylamine phosphate; quaternary ammonium salts such as benzyltriethylammonium acetate; alkali metal salts of lower aliphatic acids, such as potassium acetate, sodium acetate and lithium oxalate; and dialkylhydroxylamines such as dimethylhydroxylamine and diethylhydroxylamine.

The amount of the curing agent used is generally 0 to 5 parts by weight, preferably 0 to 1 part by weight, per 100 parts by weight of the component (A).

Filler

The fillers include, for example, fumed silica and a hydrophobic-treated fumed silica prepared by treating the surface of fumed silica with chlorosilane; wet silica; finely divided silica, colloidal calcium carbonate and those of which surfaces have been treated with a fatty acid soap, rosin or rosin ester; heavy calcium carbonate; diatomaceous earth; iron oxide; titanium oxide; zinc oxide; magnesium carbonate; zinc carbonate; metal carbonates; carbon black; and fine powdery mica. These fillers can be used singly or in a combination of two or more thereof.

The filler may be used in an amount of generally about 5 to 300 parts by weight per 100 parts by weight of said component (A).

Other Various Additives

The other additives include, for example, thixotropic improvers such as polyether compounds; adhesive assistants, for example, aminosilanes such as γ-aminopropyltriethoxysilane, and epoxysilanes such as γ-glycidylpropyltrimethoxysilane; colorants such as pigments and dyes; heat resistance improvers such as red oxide and cerium oxide; dehydrating agents; corrosion inhibitors; and silicone resins. Further, the other mildewproofing agents can be added in such an amount that a cured product of the composition does not turn yellow.

Applications of the Composition

The room temperature curable organopolysiloxane composition is useful for sealants used particularly in places where water is often used or a large amount of moisture exists, since a cured product of the composition does not turn yellow with a lapse of time and is excellent in mildew resistance.

EXAMPLES

The present invention will be hereinafter described with reference to working examples.

Example 1

100 parts of a polydimethylsiloxane having a viscosity at 25° C. of 20,000 cSt blocked with a silanol at the end of the molecular chain thereof, 10 parts by weight of a fumed silica of which surface has been treated with dimethyldichlorosilane and 0.5 part by weight of tebuconazole were mixed. Then, to the mixture, 8 parts by weight of methyltris(methylethylketoxime)silane, 0.5 part by weight of tetrakis(methylethylketoxime)silane, 1.0 part by weight of γ-aminopropyltriethoxysilane and 0.1 part by weight of dibutyltin dioctoate were admixed under a reduced pressure to prepare a deoxime type room temperature curable organopolysiloxane composition. The constitution of the resulting room temperature curable organopolysiloxane composition is shown in Table 1. Then, the composition was subjected to the following crack test, discoloration test and mildewproofing test. The results are shown in Table 2.

Crack Test

Backup materials consisting of two foamed polyethylenes were laid on an aluminum plate having a thickness of 0.3 mm to form a groove having a width of 10 mm, a length of 100 mm, and a depth of 5 mm. The groove was then filled with the resulting room temperature curable organopolysiloxane composition. Thereafter, the aluminum plate was bent at a line crossing at right angles with respect to the lengthwise direction of the groove every predetermined time to measure the shortest time when occurrence of cracks stops on the surface of the composition filled in the groove. Incidentally, the atmosphere at this time was 20° C. and 55% RH.

Discoloration Test

The resulting room temperature curable organopolysiloxane composition was formed into a sheet having a thickness of 2 mm and the sheet was left to stand in the atmosphere of 20±3° C. and 55±10% RH for one week to cure. As to the cured sheet, the following discoloration was carried out.

Thermal Discoloration Test

The color difference (degree of yellowing : Δb) between a cured sheet heated 90° C. for 500 hours in a circulation type dryer and the cured sheet before heating was measured using color-difference meter CR-300 manufactured by Minolta Camera Co., Ltd. The larger the value of Δb, the more remarkable the degree of yellowing.

Ultraviolet Light-Discoloration Test

The color difference (degree of yellowing : Δb) between a cured sheet irradiated by ultraviolet light from a medical bactericidal lamp at a distance of 10 cm from the surface of the sheet for 24 hours and the cured sheet before irradiating ultraviolet light was measured using color-difference meter CR-300 manufactured by Minolta Camera Co., Ltd. The larger the value of Δb, the more remarkable the degree of yellowing.

Mildew Resistance Test

As to the same cured sheet as used in the discoloration test, mildew resistance test was carried out according to JIS Z 2911. Incidentally, the evaluation was conducted in accordance with the following criteria.

A: The growth of mildew hypha was not quite observed on the surface of the cured sheet.

B: The growth of mildew hypha is observed on the surface of the cured sheet and the area of the growth accounts for ⅓ or less of the surface area of the sheet.

C: The growth of mildew hypha is observed on the surface of the cured sheet and the area of the growth accounts for more than ⅓ of the surface area of the sheet.

Example 2

A deoxime type room temperature curable organopolysiloxane composition was prepared in the same manner as in Example 1, except that the amount of tebuconazole was changed to 1.5 parts by weight from 0.5 part by weight, the amount of methyltris(methylethylketoxime)silane to 7 parts by weight from 8 parts by weight, and the amount of tetrakis(methylethylketoxime)silane to 1.0 part by weight from 0.5 part by weight. The constitution of the resulting room temperature curable organopolysiloxane composition is shown in Table 1. Then, as to the composition, the crack test, the discoloration test and the mildew resistance test were carried out in the same manners as in Example 1. The results are shown in Table 2.

Example 3

A deoxime type room temperature curable organopolysiloxane composition was prepared in the same manner as in Example 1, except that in place of 8 parts by weight of methyltris(methylethylketoxime)silane and 0.5 part by weight of tetrakis(methylethylketoxime)silane, 5 parts by weight of methyltris(methylethylketoxime)silane and 3 parts by weight of vinyltris(methylethylketoxime)silane were used. The constitution of the resulting room temperature curable organopolysiloxane composition is shown in Table 1. Then, as to the composition, the crack test, the discoloration test and the mildew resistance test were carried out in the same manners as in Example 1. The results are shown in Table 2.

Example 4

A deoxime type room temperature curable organopolysiloxane composition was prepared in the same manner as in Example 2, except that in place of 7 parts by weight of methyltris(methylethylketoxime)silane and 1.0 part by weight of tetrakis(methylethylketoxime)silane, 6 parts by weight of methyltris(methylethylketoxime)silane and 1 part by weight of vinyltris(methylethylketoxime)silane were used. The constitution of the resulting room temperature curable organopolysiloxane composition is shown in Table 1. Then, as to the composition, the crack test, the discoloration test and the mildew resistance test were carried out in the same manners as in Example 1. The results are shown in Table 2.

Example 5

A deoxime type room temperature curable organopolysiloxane composition was prepared in the same manner as in Example 1, except that tetrakis(methylethylketoxime)silane was not used. The constitution of the resulting room temperature curable organopolysiloxane composition is shown in Table 1. The constitution of the resulting room temperature curable organopolysiloxane composition is shown in Table 1. Then, as to the composition, the crack test, the discoloration test and the mildew resistance test were carried out in the same manners as in Example 1. The results are shown in Table 2.

TABLE 1

| Constitution of composition (part by weight) | Example 1 | Example 2 | Example 3 | Example 4 | Example 5 |
|---|---|---|---|---|---|
| (A)Polydimethylsiloxane | 100 | 100 | 100 | 100 | 100 |
| (B)Methyltris (methylethylketoxime) silane | 8 | 7 | 5 | 6 | 8 |
| (B')Tetrakis (methylethylketoxime) silane | 0.5 | 1.0 | — | — | — |
| (B)Vinyltris (methylethylketoxime)silane | — | — | 3 | 1 | — |
| (C)Tebuconazole | 0.5 | 1.5 | 0.5 | 1.5 | 0.5 |
| Fumed silica | 10 | 10 | 10 | 10 | 10 |

TABLE 1-continued

| Constitution of composition (part by weight) | Example 1 | Example 2 | Example 3 | Example 4 | Example 5 |
|---|---|---|---|---|---|
| γ-Aminopropyltriethoxysilane | 1.0 | 1.0 | 1.0 | 1.0 | 1.0 |
| Dibutyltin dioctoate | 0.1 | 0.1 | 0.1 | 0.1 | 0.1 |

TABLE 2

| Evaluation test | Example 1 | Example 2 | Example 3 | Example 4 | Example 5 |
|---|---|---|---|---|---|
| Crack test (hour) | 2 | 1.5 | 1.5 | 2 | 10 |
| Thermal discoloration (Δb) | 2.95 | 3.15 | 5.80 | 4.95 | 2.98 |
| UV light discoloration (Δb) | 2.65 | 2.98 | 4.36 | 4.25 | 2.08 |
| Mildew resistance | A | A | A | A | A |

Example 6

100 parts of a polydimethylsiloxane having a viscosity at 25° C. of 20,000 cSt blocked with a silanol at the end of the molecular chain thereof, 10 parts by weight of a fumed silica of which surface has been treated with dimethyldichlorosilane and 0.5 part by weight of tebuconazole were mixed. Then, to the mixture, 8 parts by weight of methyltributanoximesilane and 1.0 part by weight of γ-aminopropyltriethoxysilane and 0.1 part by weight of dibutyltin dioctoate were admixed under a reduced pressure to prepare a room temperature curable organopolysiloxane composition. The constitution of the resulting room temperature curable organopolysiloxane composition is shown in Table 3. Then, as to the composition, the discoloration test and the mildew resistance test were carried out in the same manners as in Example 1. The results are shown in Table 4.

Example 7

A room temperature curable organopolysiloxane composition was prepared in the same manner as in Example 5, except that the amount of tebuconazole was changed to 1.5 parts by weight from 0.5 part by weight. The constitution of the resulting room temperature curable organopolysiloxane composition is shown in Table 3. Then, as to the composition, the discoloration test and the mildew resistance test were carried out in the same manners as in Example 1. The results are shown in Table 4.

Example 8

A room temperature curable organopolysiloxane composition was prepared in the same manner as in Example 5, except that the amount of tebuconazole was changed to 1.0 part by weight from 0.5 part by weight. The constitution of the resulting room temperature curable organopolysiloxane composition is shown in Table 3. Then, as to the composition, the discoloration test and the mildew resistance test were carried out in the same manners as in Example 1. The results are shown in Table 4.

Comparative Example 1

A room temperature curable organopolysiloxane composition was prepared in the same manner as in Example 6, except that 0.5 part by weight of tebuconazole was replaced with 0.5 part by weight of 2-(4-thiazolyl)benzimidazole, and 8 parts by weight of methyltributanoximesilane was replaced with 8 parts by weight of methyltrimethoxysilane. The constitution of the resulting room temperature curable organopolysiloxane composition is shown in Table 3. Then, as to the composition, the discoloration test and the mildew resistance test were carried out in the same manners as in Example 1. The results are shown in Table 4.

Comparative Example 2

A room temperature curable organopolysiloxane composition was prepared in the same manner as in Example 6, except that 0.5 part by weight of tebuconazole was replaced with 0.5 part by weight of Zinc Pyrithione. The constitution of the resulting room temperature curable organopolysiloxane composition is shown in Table 3. Then, as to the composition, the discoloration test and the mildew resistance test were carried out in the same manners as in Example 1. The results are shown in Table 4.

TABLE 3

| Constitution of composition (part by weight) | Example 6 | Example 7 | Example 8 | Comp. Example 1 | Comp. Example 2 |
|---|---|---|---|---|---|
| (A)Polydimethylsiloxane | 100 | 100 | 100 | 100 | 100 |
| (B)Methyltributanoximesilane | 8 | 8 | — | — | 8 |
| (B)Methyltrimethoxysilane | — | — | 8 | 8 | — |
| (C)Tebuconazole | 0.5 | 1.5 | 1.0 | — | — |
| 2-(4-thiazolyl)benzimidazole | — | — | 0.5 | — | — |
| Zinc Pyrithione | — | — | — | — | 0.5 |
| Fumed silica | 10 | 10 | 10 | 10 | 10 |
| γ-Aminopropyltriethoxysilane | 1 | 1 | 1 | 1 | 1 |
| Dibutyltin dioctoate | 0.1 | 0.1 | 0.1 | 0.1 | 0.1 |

TABLE 4

| Evaluation test | Example 6 | Example 7 | Example 8 | Comp. Example 1 | Comp. Example 2 |
|---|---|---|---|---|---|
| Thermal discoloration (Δb) | 3.02 | 4.42 | 2.98 | 12.50 | 4.91 |
| UV light discoloration (Δb) | 2.84 | 2.52 | 2.12 | 5.41 | 7.97 |
| Mildew resistance | A | A | A | A | A |

What is claimed is:

1. A room temperature curable mildew resistant organopolysiloxane composition, comprising (A) a fluid hydroxyl or hydrolyzable group-containing organopolysiloxane represented by the following general formula (1):

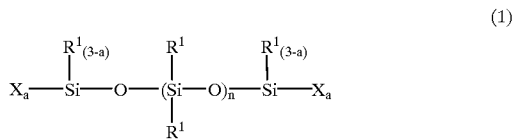

wherein X is a hydroxyl group or a hydrolyzable group, a plurality of $R^1$, which may be the same or different, are independently a monovalent hydrocarbon group, n is an integer of 8 or more, so that the organopolysiloxane has a viscosity at 25° C. of from 25 to 500,000 cSt and a is an integer of 1 to 3;

(B) from 0.1 to 30 parts by weight per 100 parts by weight of (A) of at least one compound selected from the group consisting of a hydrolyzable organosilane represented by the following general formula (2-b):

$$R^8_e Si(ON=CR^9{}_2)_{(4-e)} \qquad (2\text{-}b)$$

wherein $R^8$ is an unsubstituted or substituted monovalent saturated aliphatic hydrocarbon group, $R^9$ is an unsubstituted or substituted monovalent hydrocarbon group, and e is an integer of 1 to 2; and a partially hydrolyzed product thereof;

(B') from 0.1 to 10 parts by weight per 100 parts by weight of (A) of at least one compound selected from the group consisting of a hydrolyzable silane represented by the following general formula (2-b'):

$$Si(ON=CR^9{}_2)_4 \qquad (2\text{-}b')$$

wherein $R^9$ is an unsubstituted or substituted monovalent hydrocarbon group, and a partially hydrolyzed product thereof; and (C) from 0.1 to 5 parts by weight per 100 parts by weight of (A) of a triazolyl group-containing compound represented by the following general formula (3):

$$Y-CR^3R^4-CR^5R^6-Z \qquad (3)$$

wherein $R^3$ and $R^4$ are independently a hydrogen atom or an unsubstituted or substituted monovalent hydrocarbon group, $R^5$ and $R^6$ are independently a hydrogen atom, an alkyl group or an alkoxyl group, Y is a hydroxyl group or a nitrile group, and z is a triazolyl group.

2. The composition according to claim 1, wherein in said general formula (1), $R^1$ is an unsubstituted or substituted monovalent hydrocarbon group having 1 to 10 carbon atoms.

3. The composition according to claim 1, wherein in said general formula (1), $R^1$ is an unsubstituted or substituted monovalent hydrocarbon group having 1 to 10 carbon atoms and containing no aliphatic unsaturation.

4. The composition according to claim 1, wherein in said general formula (1), each of the hydrolyzable group X is selected from the group consisting of alkoxy, ketoxime, acyloxy, amino, amido, aminoxy and alkenyloxy groups.

5. The composition according to claim 1, wherein the component (A) is a silanol group-containing organopolysiloxane represented by the following general formula (1-a):

$$HO(SiR^1{}_2O)_p H \qquad (1\text{-}a)$$

wherein $R^1$ is as defined in claim 1, and p is an integer of 10 or more so that the organopolysiloxane has a viscosity at 25° C. of 25 to 500,000 cSt.

6. The composition according to claim 1, wherein the component (A) is a hydrolyzable group-containing organopolysiloxane represented by the following general formula (1-b):

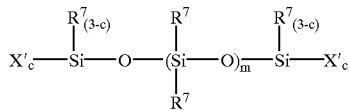
(1-b)

wherein a plurality of $R^7$ are an unsubstituted or substituted monovalent hydrocarbon group having 1 to 10 carbon atoms, a plurality of X' are a hydrolyzable group, c is an integer of from 2 to 3 on average, and m is an integer of 10 or more so that the organopolysiloxane has a viscosity at 25° C. of 25 to 500,000 cSt.

7. The composition according to claim 6, wherein the hydrolyzable group-containing organopolysiloxane of the component (A) represented by the general formula (1-b) is present in combination with the triazolyl group-containing compound, as the component (C), in which the triazolyl group Z in said general formula (3) is a 1,2,4-triazole-1-yl group represented by the following formula (3-a):

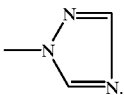

8. The composition according to claim 7, wherein said triazolyl group-containing compound of the component (C) is 2-(4-chlorophenyl)ethyl-α-(1,1-dimethylethyl)-1H-1,2,4-triazole-1-yl-ethanol.

9. The composition according to claim 1, wherein the components (B) and (B') as defined in claim 1 are present in combination with a triazolyl group-containing compound, as the component (C), represented by the formula (3-a) as defined in claim 7.

10. The composition according to claim 9, wherein said triazolyl group-containing compound of the component (C) is 2-(4-chlorophenyl)ethyl-α-(1,1-dimethylethyl)-1H-1,2,4-triazole-1-yl-ethanol.

* * * * *